(12) United States Patent
Leon

(10) Patent No.: US 10,207,760 B2
(45) Date of Patent: Feb. 19, 2019

(54) MOUNTING PLATE FOR BICYCLE ATTACHMENTS

(71) Applicant: Michael A. Leon, Orlando, FL (US)

(72) Inventor: Michael A. Leon, Orlando, FL (US)

( * ) Notice: Subject to any disclaimer, the term of this patent is extended or adjusted under 35 U.S.C. 154(b) by 0 days.

(21) Appl. No.: 15/530,604

(22) Filed: Feb. 6, 2017

(65) Prior Publication Data

US 2018/0222543 A1 Aug. 9, 2018

(51) Int. Cl.
*B62J 11/00* (2006.01)
*B62J 7/04* (2006.01)
*B62K 25/02* (2006.01)

(52) U.S. Cl.
CPC .............. *B62J 7/04* (2013.01); *B62J 11/00* (2013.01); *B62K 2025/025* (2013.01)

(58) Field of Classification Search
CPC ...... B62H 1/12; B62H 7/00; B62J 7/00; B62J 7/04; B62J 7/08; B62J 9/00; B62J 9/001; B62J 9/02; B62J 11/00; B62K 2025/025
USPC .............. 119/771; 224/422, 424, 450, 412, 224/441–442, 447–448, 456, 461, 545, 224/547; 280/293; 301/124.2
See application file for complete search history.

(56) References Cited

U.S. PATENT DOCUMENTS

| | | | | |
|---|---|---|---|---|
| 3,825,214 A * | 7/1974 | Ciolfi | ................ | B62J 11/00 248/300 |
| 5,339,660 A * | 8/1994 | Fell | ................ | B60B 27/023 301/124.2 |
| 5,375,561 A | 12/1994 | Gundersen | | |
| 5,448,402 A * | 9/1995 | Lorenzana | ................ | B62J 6/20 116/28 R |
| 5,655,695 A * | 8/1997 | Anderson | ................ | B62J 11/00 206/315.1 |
| 5,665,695 A * | 9/1997 | Kaiser | ................ | A61K 8/466 510/426 |
| 5,842,445 A | 12/1998 | Barbour | | |
| 6,148,772 A * | 11/2000 | Keyek-Frannsen | ...... | A01K 1/04 119/771 |
| 6,273,391 B1 * | 8/2001 | Engolia | ................ | A01K 97/10 224/422 |
| 7,013,840 B2 * | 3/2006 | Leon | ................ | A01K 1/04 119/771 |
| 7,722,129 B2 * | 5/2010 | Cusack | ................ | B62K 25/02 301/110.5 |

(Continued)

*Primary Examiner* — Scott T McNurlen
(74) *Attorney, Agent, or Firm* — Harry I. Leon; Vivian L. Steadman

(57) ABSTRACT

An elongated, plate-like structure on which bicycle accessories can be mounted, that is held in place at one end of a bicycle's rear wheel axle or, alternately, ids axial skewer. The latter, like the rear wheel axle, includes bolt threads for threadedly engaging a nut at said end. Supported on either the bike's right or left side, the structure, which extends both perpendicularly to and rearwardly from the rear wheel's rotational axis, defines multiple through openings. Among them is a round aperture sized to slideably receive the rear wheel axle or, alternately, just a part of the skewer-engageable nut at the same time the nut's annular shoulder abuts the structure's outer face. Distal from the round aperture, the structure's generally flat inner face defines a small protuberance which, in use, restrains, from sideways slippage, a bicycle tow leash clamped onto an opening-free portion of the structure's midsection.

6 Claims, 3 Drawing Sheets

(56) References Cited

U.S. PATENT DOCUMENTS

| | | | |
|---|---|---|---|
| 8,544,420 B2* | 10/2013 | Leon | A01K 27/003 |
| | | | 119/771 |
| 9,994,275 B1 | 6/2018 | Leon | |
| 2007/0164532 A1* | 7/2007 | Nemec | B62J 11/00 |
| | | | 280/202 |
| 2011/0277699 A1* | 11/2011 | McCarthy | A01K 1/04 |
| | | | 119/771 |
| 2018/0222543 A1 | 8/2018 | Leon | |

* cited by examiner

MOUNTING PLATE FOR BICYCLE ATTACHMENTS

BACKGROUND OF THE INVENTION

Among the many attachments for a bicycle that find a suitable mounting site near its axles are lights, horns, foot rests and even bicycle dog leashes, also known as bicycle tow leashes. Mounting the latter is complicated by several factors including the reality that on many bicycles, the sprockets and derailleur interfere with the optimal location for attaching the leash to the bicycle's frame when the user prefers to keep the dog out of the line of traffic—that is, on the bike's right side.

Located at the bicycle attachment end of each bike tow leash (BTL) is a clamp-with-connector. As taught by Leon in U.S. Patent Nos. 7,013,840 and 8,544,420, the clamp-with-connector includes an inner clamp member and a L-shaped, dual function outer clamp/connector member. The L-shaped, dual function member has two elongated arms, one arm of which—the outer clamp—is held in a generally upright position and the other arm of which—the connector—extends perpendicularly to the outer clamp at its lower end and in a direction away from the inner clamp member when it and the outer clamp/connector member, in assembled relation with a pair of bolts and hand-tightened nuts, grip the clamp-with-connector onto a bike's frame near the rear wheel axle.

A device is needed which supplants the use of a bicycle's rear wheel support frame as the structure of choice on which to attach the clamp-with-connector, so that the user can deploy a bike tow leash on either the right or the left side of his bicycle or, alternately, readily change from one side to the other if he so chooses.

SUMMARY OF THE INVENTION

In accordance with the present invention, there is provided a mounting structure, in the form of an elongated, rigid, generally flat metal plate, which is held in place at one end of a bicycle's rear wheel axle and which extends perpendicularly thereto, with said end being located on either the right or left side of the bicycle. Defining a round aperture sized to slideably receive said end of the rear wheel axle, with the round aperture being set back only a very short distance from the plate's outer periphery at one of its distal ends, the plate itself can be oriented, during use, in such a way that most of the plate's bulk extends rearwardly of the rear wheel axle's rotational axis.

So oriented, the plate is ideally positioned to serve as the structure of choice on which to attach Leon's clamp-with-connector. Specifically, one can deploy the connector, when the clamp-with-connector is gripped onto the plate's flat midsection, in such a way that the connector projects both outwardly from the bicycle and downwardly of its rear wheel axle's rotational axis, thus greatly reducing the likelihood that harsh sideways pulls by an animal tethered, via the connector, to the bicycle would destabilize and tip it. Moreover, since the bottom of the bike's rear tire is the point from which the bike pivots as it is being steered, the closer to the rear wheel axle that the inner clamp member and the outer clamp arm grip the clamp-with-connector onto the plate, the less effect a dog tethered, by means of the the connector, to the bike will have on its steerability whenever the dog lunges sideways.

In addition, the plate's transverse width—that is, its width as measured between the plate's top and bottom edges—is exceeded, along the plate's entire length, by the distance that separates the pair of bolts, each of which is deployed, along with a hand-tightened nut, during use, to hold the inner clamp member and the outer clamp arm, in assembled relation, as they grip the clamp-with-connector onto the plate. The distance which separates said two bolts is the same as that between a first pair of spaced apart top and bottom apertures defined by the inner clamp member, as well as that between a second pair of spaced apart top and bottom apertures defined by the outer clamp arm. Importantly, the plate's transverse width increases incrementally the further said transverse width is measured away from the round aperture—and within an expanse lying between said round aperture and the plate's end furthest therefrom—until the transverse width is at most just wide enough to allow a user to bolt the inner clamp member and the outer clamp arm together in order to grip the clamp-with-connector onto the plate.

Not only because the nuts threadedly engaged with said two bolts are only manually tightened, but also because the plate's transverse width in close proximity to the round aperture is short enough that sizeable gap(s) of space are left unoccupied by the plate, the clamp-with-connector gives when subjected to sudden motions of the bicycle or dog. Specifically, such a gap or gaps are located either between the plate's top edge and the upper bolt in said pair of bolts or between the plate's bottom edge and the lower bolt in said pair; or possibly, two such gaps exist in tandem in which one is located above the plate's top edge and the other below the plate's bottom edge. Indeed, by design, the clamp-with-connector, when positioned contiguous with the rear wheel axle's retainer nut and so subjected to such a sudden motion, has room to slide sideways away from the retainer nut and/or reposition itself vertically with respect to the plate's top and bottom edges.

Nevertheless, a restraint in the form of a small protuberance is located on the plate's inner face in close proximity to its rear edge and about midway between the plate's top and bottom edges. Preferably made with the use of a punch, delivered to the plate's outer face, the protuberance's formation is accompanied by a dimple's creation as the plate yields to the punch. The protuberance and a configuration of said edges next to it in which they are aligned in parallel with each other are designed to keep the clamp-with-connector, however close to the retainer nut it may have been deployed, from sliding off of the plate. Also, for those bike frames with a tapped hole to which the plate can be bolted, thereby keeping it from potentially rotating about its rear wheel axle/axial skewer attachment, the clamp-with-connector, gripped onto the plate, can be spaced so far apart from the retainer nut that the inner clamp member abuts, against the protuberance throughout the plate's use.

DETAILED DESCRIPTION OF THE PREFERRED EMBODIMENTS

Figure 1:
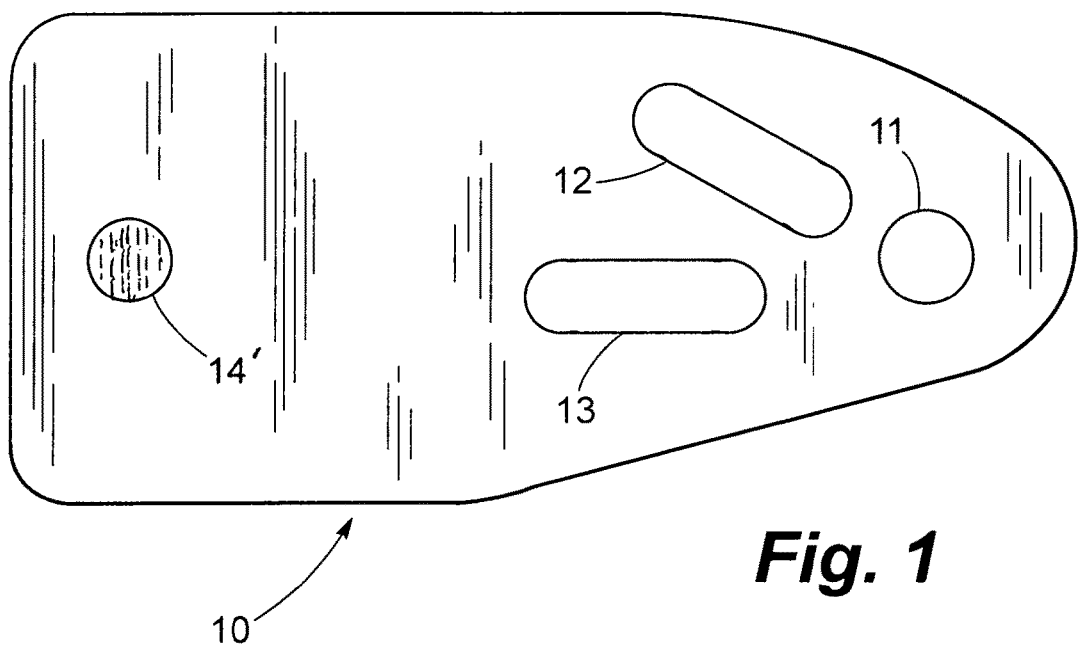
FIG. 1 is a plan view of the elongated rigid, generally flat plate according to the present invention.
Figure 2:
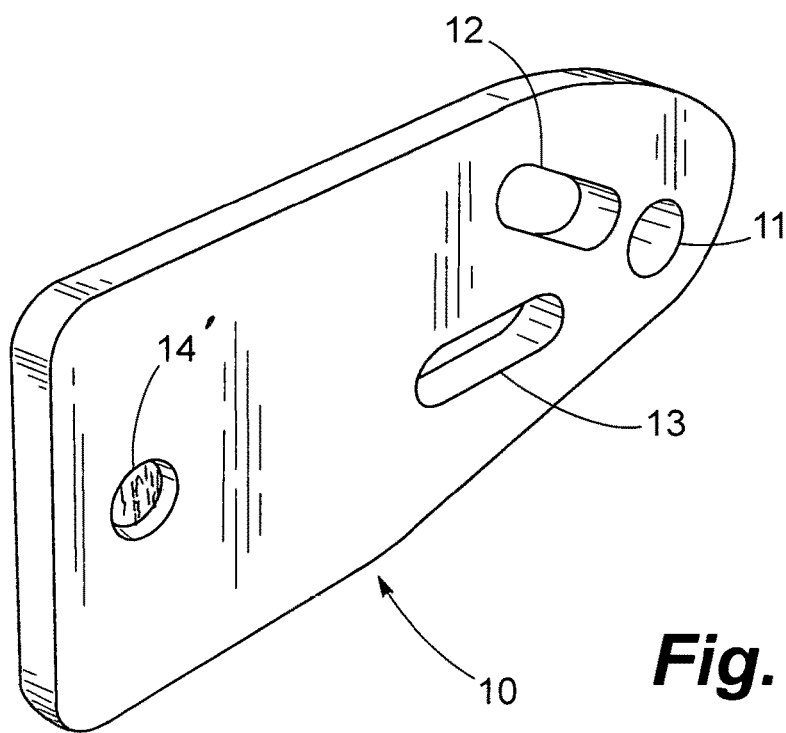
FIG. 2 is a top side perspective view of the plate according to FIG. 1.
Figure 3:
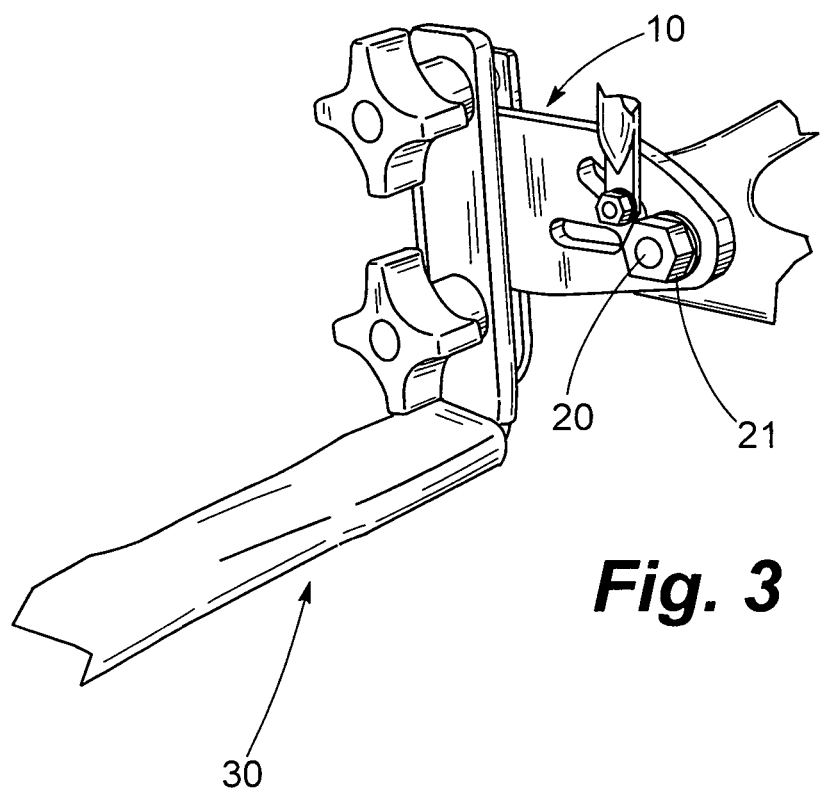
FIG. 3 is a front perspective view of the plate according to FIG. 1, wherein the plate is shown held in place, on the right side of a bicycle, at one end of its rear wheel axle once the end, slideahly inserted through the plate's round aperture, is threadedly engaged by a nut; and wherein a bicycle tow leash's clamp-with-connector is shown mounted on the plate but with only a fragment of the leash itself being depicted, along with fragmentary portions of an accessory bolted onto one of the plate's elongated through openings and of the bike's rear wheel support frame.
Figure 4:
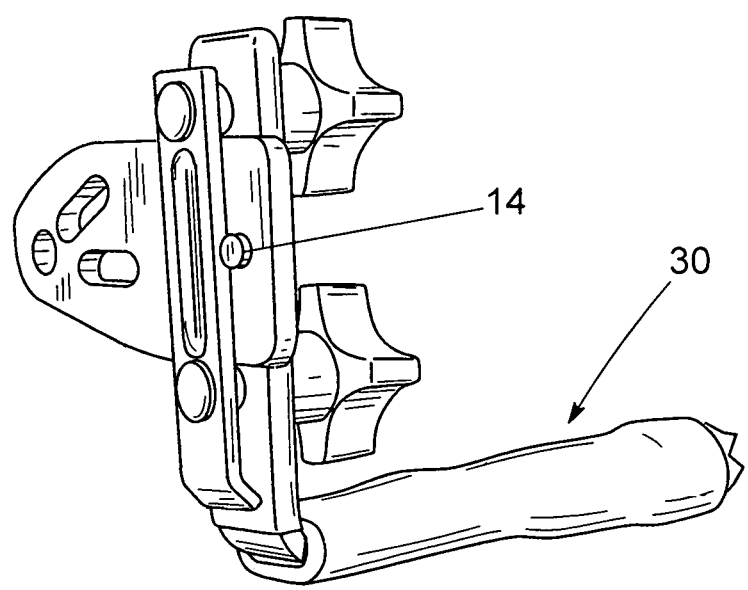
FIG. 4 is a back perspective view of the plate according to FIG. 1, wherein a bicycle tow leash's clamp-with-connector is shown mounted on the plate, with the inner clamp member of this clamp-with-connector abutting a cylindrically-shaped side wall of a small protuberance located on the plate's inner face and with only a fragment of the leash itself be illustrated.
Figure 6:
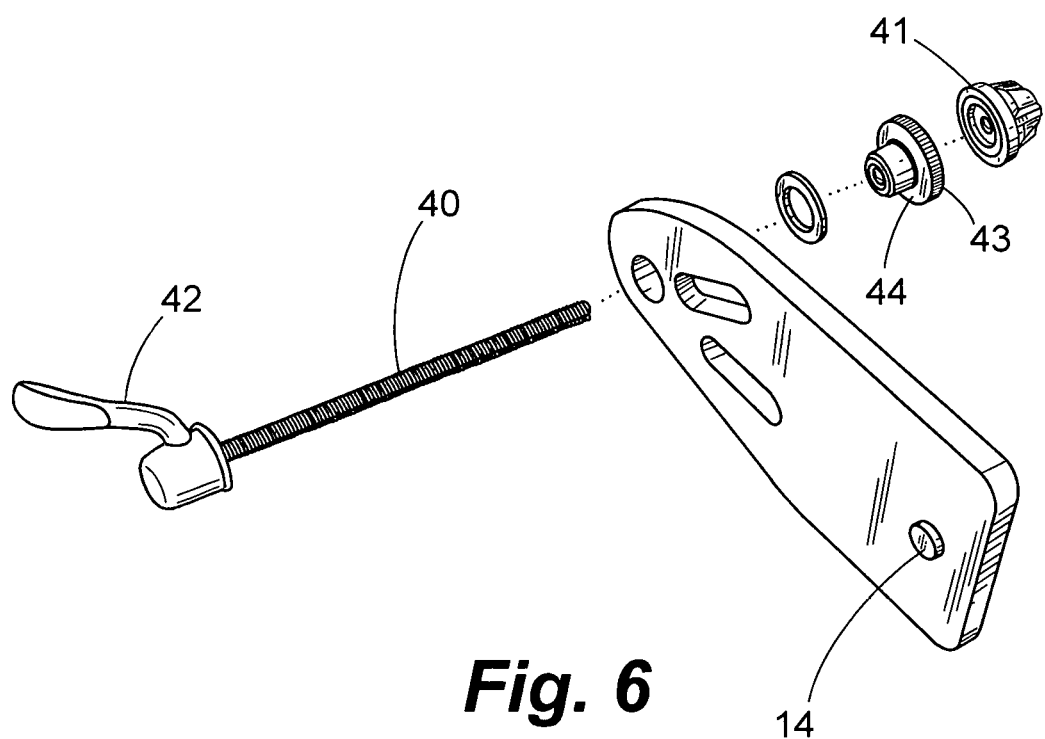
FIG. 6 is an exploded view of the plate and of the skewer-engageable nut with its plate-abutting annular shoulder, both of which are depicted in FIG. 5, as well as of a bicycle's rear axial skewer and the latter's nut fastener.

In the drawings, a robust, metal plate mountable on a bicycle for attaching a clamp-with-connector, as well as other accessories, to one side thereof and in close proximity to the bike's rear wheel axle is indicated generally by the reference numeral 10. The inner and outer surface of the plate, which is fabricated of high strength aluminum or its equivalent, are approximately flat, punctuated only by a small protuberance 14 and its corresponding dimple 14', respectively, and at least one through opening 11 -13 (FIGS. 1, 2 and 6). The latter includes a round aperture 11 which is disposed near points on the plate's outer periphery which are distal, by a wide expanse, from the protuberance 14.

This wide expanse, with the protuberance 14 preferably set back from the plate's edge closest to it by ½inch and contiguous with an opening-free portion of the plate's midsection, measures as much as 3 ½inches across longitudinally —most of the plate's overall length 4at its greatest span. Perpendicularly thereto and crosswise of said wide expanse, the distance between the plate's top and bottom edges increases the further away from the round aperture 11 said distance is measured until spacing between the top and bottom edges is at most about 2 inches. This much spacing between the top and bottom edges —which is found across most of said opening-free portion —is just wide enough to allow a user to bolt inner and outer clamp members of a clamp-with-connector 30 together in order to grip it onto the plate 10 (FIGS. 1, 3-5).

During the plate's installation, a nut 21 is removed from the bicycle's rear wheel axle 20; and the plate 10, with its round aperture 11 sized to slideably receive the axle, is then slip-fitted onto it. Once the plate 10 has been rotated into its working position, the nut 21 is replaced and tightened. A washer, shim or like spacer may also be inserted between the nut and the plate to help support the latter.

Alternately, the plate 10 with the same round aperture 11 can be used on bikes having wheels that can be removed without the use of tools. Typically, such bikes are equipped with an elongated bolt 40 known as a skewer and a nut fastener 41 (FIG. 6). The skewer's elongated handle 42 provides enough leverage that one can tighten the bolt 40 and nut fastener 41 manually, also without the use of tools.

Figure 5:
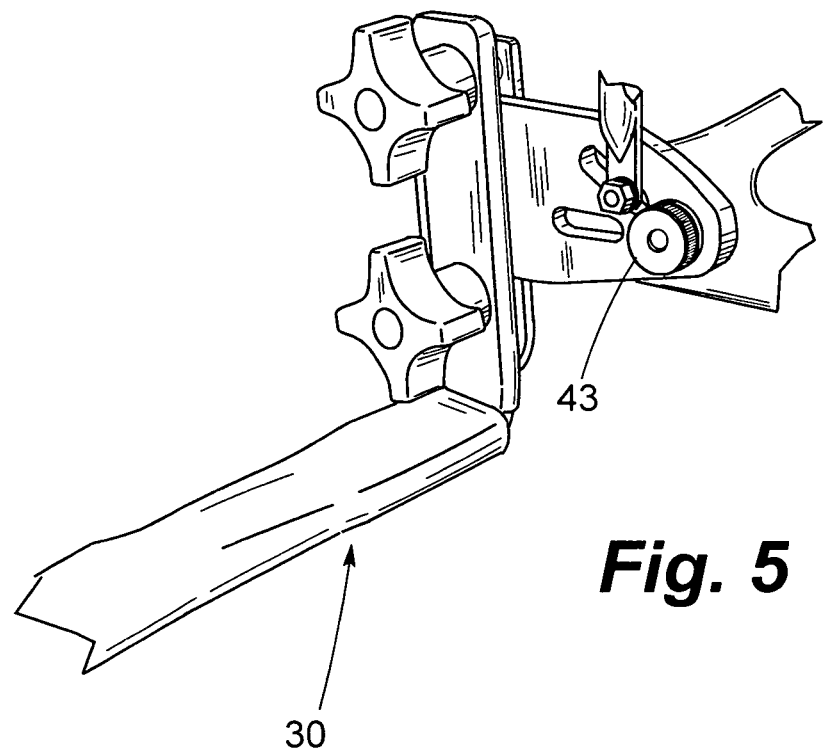
FIG. 5 is a front perspective view of the plate according to FIG. 1, wherein the plate is shown held in place, on the right side of a bicycle, at a bolt-threaded end of its rear axial skewer—otherwise used to facilitate a quick removal of the rear wheel—once the skewer's end threadedly engages a nut, just part of which can be slideably received within the round aperture at the same time the nut's annular shoulder abuts the plate's outer face; and wherein a bicycle tow leash's clamp-with-connector is shown mounted on the plate but with only a fragment of the leash itself being depicted as in FIG. 3.

So that one can mount the plate 10 at one end of a bike's existing skewer/elongated bolt 10, there is provided a recessed nut 43, part of which is a cylindrical-in-shape barrel of small enough outer diameter that said barrel can be slip-fitted into the round aperture 11, but only as far as the barrel's juncture with the nut's oversized capturing flange which, together with the barrel, forms an annular shoulder 44 (FIGS. 5 and 6). In order that the need for a longer-skewer/elongated bolt 40 to compensate for the plate's thickness can be negated, the barrel's length is approximately equal to a thickness of the plate contiguous with the round aperture 11. Further, if the bolt 40 is of sufficient length, the nut fastener 41 can be used as a lock nut for the recessed nut 43 (FIG. 6). Again, a washer or the like can be inserted between the recessed nut 43 and the plate to help support it.

In the preferred embodiments, the plate 10 defines, in addition to the round aperture 11, two elongated through openings in the form of divergent slots 12, 13. When the plate has been installed in position for use and at least one of the slots then reaches across a tapped hole in the bike's frame, so as to make the tapped hole accessible, a person, with the use of a single bolt threadedly engageable with said hole, can not only reattach the bicycle's derailleur, tail light, or the like, but also keep the plate from -rotating about the axial skewer 40 (FIG. 5).

It is claimed:

1. In an apparatus for tethering a dog to a bicycle, the apparatus including a clamp-with-connector which has an inner clamp member and a L-shaped, outer clamp/connector member, wherein the L-shaped member has two elongated arms, one of which is an outer clamp arm and the other of which is a leash connector, with the connector, when the outer clamp arm is held in a generally upright position, extending perpendicularly to the outer clamp arm at a lower end and in a direction away from the inner clamp member, at the same time the inner clamp member and the outer clamp arm, in assembled relation with a pair of bolts and hand-tightened nuts threadedly engageable therewith, attach the apparatus to one side of the bicycle at a rear wheel axle thereof, wherein the improvement comprises:

a mounting structure embodied in an elongated, flat metal plate that includes both spaced apart first and second distal ends and forward and rearward end portions that merge with each other midway between the distal ends, with the forward end portion defining at least two through openings including a round aperture and an elongated slot, with the round aperture being disposed proximate with the plate's first distal end and the elongated slot being disposed between the round aperture and the second distal end;

means for supporting the plate on the bicycle's side in such a way that the plate is held in place at one end of the bicycle's rear wheel axle and extends perpendicularly thereto at the same time the plate's second distal end is positioned rearwardly of the plate's first distal end, the means for so supporting the plate including the round aperture, sized to slideably receive the rear wheel axle, and a nut threadedly engageable with the axle so received;

wherein when the plate's second distal end is so positioned rearwardly of the plate's first distal end, each transverse width of the plate's forward end portion, as measured between the plate's top and bottom edges, is exceeded by spacing that separates said pair of bolts from each other whenever the bolts, together with the hand-tightened nuts, are deployed to hold the inner clamp member and the outer clamp arm, in assembled relation, at the same time they grip the clamp-with-connector onto the plate;

wherein each transverse width of the plate's forward end portion, measured rearwardly of the round aperture, increases incrementally the further away from the round aperture such a transverse width is measured, while the forward end portion, rearwardly of the round aperture, has an average transverse width that is short enough, in comparison to the spacing that separates said pair of bolts from each other, that, when the clamp-with-connector is gripped onto the forward end portion at a site thereon contiguous with the round aperture and rearwardly thereof, at least one sizeable gap of space between the inner clamp member and the outer clamp arm is left unoccupied by the plate, with the sizeable gap being located between one of the plate's edges and the bolt in said pair of bolts in closest proximity thereto and being otherwise dimensioned to receive part of the plate along said edge;

wherein the rearward end portion of the plate is bounded, in part, by spaced apart first and second edges that are continuations of the forward end portion's top and bottom edges, respectively, with the first and second edges extending longitudinally along said rearward end portion's top and bottom, respectively; and wherein the first and second edges are aligned in parallel with, and spaced apart from, each other by a uniform transverse width which is just wide enough for the inner clamp member and the outer clamp arm to be bolted together in order to grip the clamp-with-connector onto the plate's rearward end portion;

wherein a solid-core protuberance joined to the plate defines a cylindrically-shaped side wall that protrudes perpendicularly from a flat inner face of the plate's rearward end portion and is disposed proximate with the second distal end;

wherein at the same time the clamp-with-connector is gripped onto the plate's rearward end portion forwardly of the protuberance, the inner clamp member is routed across the plate from the first edge of said rearward end portion to the second edge thereof in such a way that the inner clamp member passes alongside the protuberance's cylindrically-shaped side wall and, in so passing, at most just touches the side wall tangentially, the protuberance's cylindrically-shaped side wall helping to prevent the clamp-with-connector's inadvertently becoming detached from the plate;

wherein, during a single attachment in which the plate is held in place on the bicycle's side at one end of the rear wheel axle by the nut threadedly engageable therewith at the same time the plate is otherwise detached from the bicycle, the clamp-with-connector, gripped, via said hand-tightened nuts and pair of bolts, onto the plate's forward end portion, has room to slideably reposition itself as long as such a sizeable gap of space as said gap is left unoccupied by the plate, so that the clamp-with-connector can sustain a grip onto the plate, without damaging the rear wheel axle;

wherein, during a double attachment in which the plate is held in place on the bicycle's side at one end of the rear wheel axle by the nut threadedly engageable therewith at the same time the plate is attached elsewhere to said side of the bicycle, the clamp-with-connector, gripped onto the rearward end portion forwardly of the protuberance, is restrained from slideably repositioning itself vertically with respect to the plate by said first and second edges; and wherein the elongated slot defines a first terminal end that is disposed in closer proximity to the round aperture than a second terminal end; wherein the rearward end portion is further characterized as being free of any through openings.

2. The improvement according to claim 1, which further comprises means for bolting the plate to the bicycle during a double attachment in which the plate is so held in place on the bicycle's side at one end of the rear wheel axle at the same time the plate is attached elsewhere to said side of the bicycle, the bolting means including the elongated slot.

3. The improvement according to claim 2, wherein the rear wheel axle is an axial skewer; wherein the nut threadedly engageable therewith is a recessed nut having a barrel and an oversized capturing flange which, together with the barrel, forms an annular shoulder, with the recessed nut defining a through opening within which a terminal end of the axial skewer is both received and threadedly engaged during use; and wherein the round aperture is further characterized as being sized to slideably receive the barrel in such a way that when the barrel is so received, the annular shoulder can abut an outer face of the plate, with the barrel, during use, extending far enough into the round aperture that the axial skewer, so threadedly engaged, can be kept in a state consistent with the force needed to hold the plate in place at said terminal end of the axial skewer.

4. The improvement according to claim 1, wherein the rear wheel axle is an axial skewer; wherein the nut threadedly engageable therewith is a recessed nut having a barrel and an oversized capturing flange which, together with the barrel, forms an annular shoulder, with the recessed nut defining a through opening within which a terminal end of the axial skewer is both received and threadedly engaged during use; and wherein the round aperture is further characterized as being sized to slideably receive the barrel in such a way that when the barrel is so received, the annular shoulder can abut an outer face of the plate, with the barrel, during use, extending far enough into the round aperture that the axial skewer, so threadedly engaged, can be kept in a state consistent with the force needed to keep the plate from rotating about the skewer's terminal end during use in which said single attachment is operative.

5. The improvement according to claim 1, wherein the plate further comprises means for bolting the plate to the bicycle during use in which said double attachment is operative, the bolting means including the elongated slot.

6. The improvement according to claim 1, wherein the forward end portion defines a third through opening in the form of an elongated slot, with each elongated slot's longitudinal centerline diverging from the other slot's longitudinal centerline in a direction away from the round aperture.

* * * * *